United States Statutory Invention Registration [19]

[11] Reg. Number: H553

Wilson

[43] Published: Dec. 6, 1988

[54] PRESSURIZED PISTON EXPULSION SYSTEM

[75] Inventor: Ben F. Wilson, Huntsville, Ala.

[73] Assignee: The United States of America as represented by the Secretary of the Army, Washington, D.C.

[21] Appl. No.: 138,903

[22] Filed: Dec. 28, 1987

[51] Int. Cl.[4] ..... B65D 47/10; B67D 5/42

[52] U.S. Cl. ..... 222/389; 222/541

[56] References Cited

U.S. PATENT DOCUMENTS 4,561,568 12/1985 Hoffmeister ..... 222/130

4,566,609 1/1986 Hoffmeister et al. ..... 222/130

*Primary Examiner*—Deborah L. Kyle

*Assistant Examiner*—Michael J. Carone

*Attorney, Agent, or Firm*—John C. Garvin, Jr.; Freddie M. Bush; James T. Deaton

[57] ABSTRACT

A pressurized piston expulsion system in which an inner and smaller tank is in the form of a piston and mounted inside a larger tank by being sealably and slidably mounted therein to define two chambers in the larger tank and the smaller tank including high pressure stored gas therein with valving means for controlling flow of the gas to one side of the smaller tank and piston to cause fuel on an opposite side of the smaller tank and piston to be dispensed to a point of use.

2 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

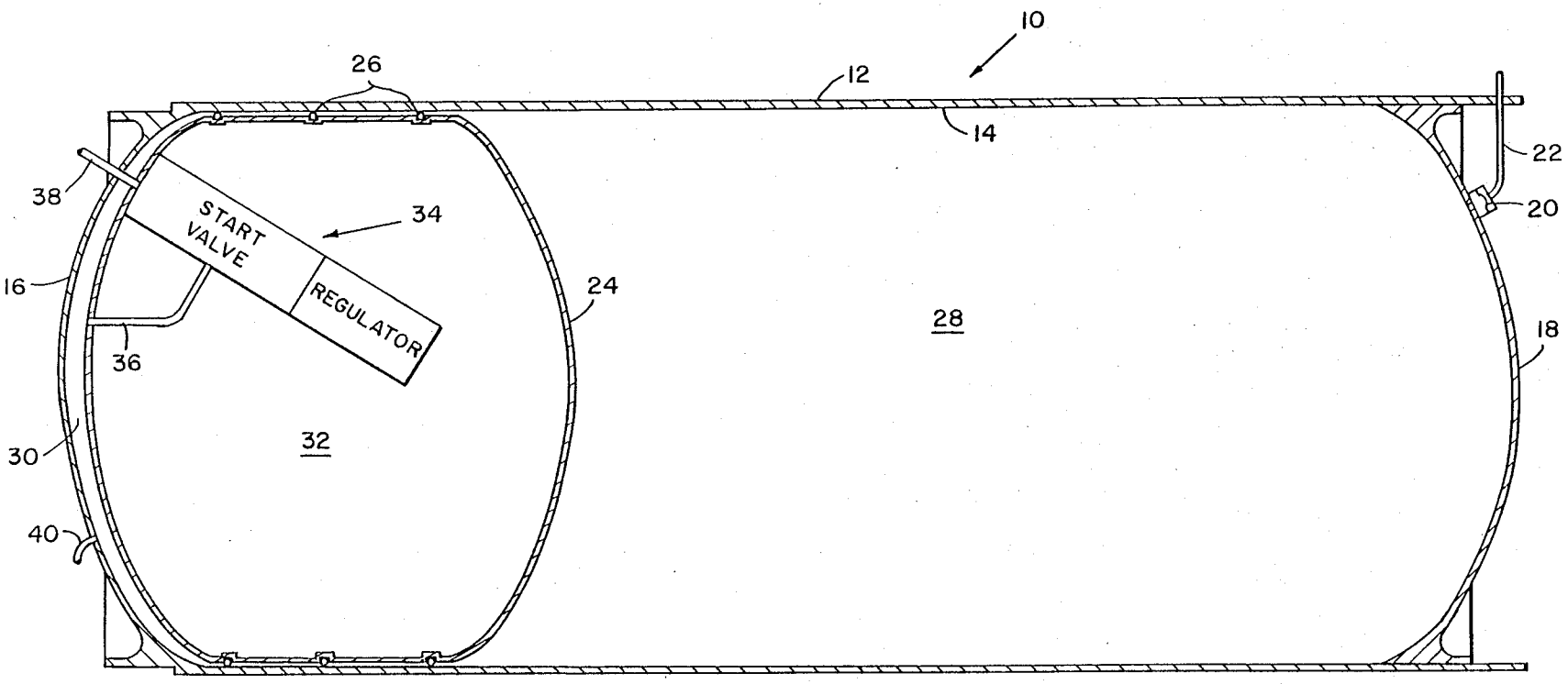
10
12
14
16
18
20
22
24
26
28
30
32
34
36
38
40
START VALVE
REGULATOR

PRESSURIZED PISTON EXPULSION SYSTEM

DEDICATORY CLAUSE

The invention described herein may be manufactured, used, and licensed by or for the Government for governmental purposes without the payment to me of any royalties thereon.

BACKGROUND OF THE INVENTION

In the past, various packaging systems have been provided, however they have not provided as light-weight and compact packaging arrangement as needed. The weight of a system often determines a particular missile system to which the packaging system can be used and the length of the space as well as the diameter of the space can be limited such that an ordinary packaging arrangement cannot be utilized. Further, in a system of the type needed, when used with a fluid system as desired by applicant, the expulsion of that fluid requires a source of pressure.

With the above need in mind, it is an object of this invention to provide a compact, light-weight and relatively simple fuel expulsion arrangement with a minimum of components.

Another object of this invention is to provide an expulsion system that provides a structure that can withstand relatively high pressures without unwanted leakage.

Still another object of this invention is to provide an expulsion system that has few parts but yet is able to accomplish the required function desired.

Other objects and advantages of this invention will be obvious to those skilled in this art.

SUMMARY OF THE INVENTION

In accordance with this invention, a pressurized piston expulsion system is provided that includes a piston in the form of a tank that is within a larger tank with the combination piston and tank being adapted to contain high pressure stored gas for being regulated and dispensed at one end of the piston to force the piston against fuel located in the large tank to expell the fuel.

BRIEF DESCRIPTION OF THE DRAWING

The single FIGURE of the drawing is a sectional view illustrating the tank arrangement in accordance with this invention.

DESCRIPTION OF THE PREFERRED EMBODIMENT

Referring now to the drawing, pressurized piston expulsion system 10 includes an elongated cylindrical section 12 that has an internal cylindrical surface 14 with end structures 16 and 18 secured to cylindrical structure 12 in any conventional manner to provide a tank structure. End wall 18 has a burst disk 20 mounted therein in a conventional manner for dispensing fuel through outlet line 22 when burst disk 20 is ruptured. A small inner tank and piston 24 has an outer cylindrical surface with seals 26 that sealably and slidably mount tank and piston 24 relative to inner cylindrical surface 14 for defining fuel chamber 28 at one side of tank and piston 24 and chamber 30 at an opposite side of tank and piston 24. Tank and piston 24 has a chamber 32 therein that is adapted to contain high pressure stored gas and a valving arrangement 34 of conventional structure for controlling flow of the high pressure gas from chamber 32 to chamber 30 is provided and this control also is adapted to regulate the gas to a particular pressure that is desired. Also, valving arrangement 34 can include valving means for filling chamber 32 with high pressure stored gas as desired. Regulated gas from valving arrangement 34 is communicated into chamber 30 through passage means 36. Valving arrangement 34 can be controlled through an electric or optic cable 38 in a conventional manner to provide controls for valving arrangement 34 as desired. Also, if desired end wall 16 can have a passage 40 for utilizing the gas pressure that has been regulated and supplied into chamber 30. Chamber 28 is adapted to contain a fuel such as a liquid or gelled fluid for being used as a fuel.

In operation with small tank and piston 24 mounted in larger tank 12 and with fuel in chamber 28 and high pressure gas in chamber 32, when one desires to dispense the fuel, control valve 34 is opened to supply regulated gas into chamber 30 to act on tank and piston 24 and expell fuel in chamber 28 against burst diaphram 20 to cause burst diaphram 20 to rupture and dispense the fuel through passage 22 to a point of use.

As will be appreciated, the pressurized piston expulsion system as disclosed herein replaces both the piston and the pressure vessel normally used in such an arrangement by a single tank that acts as a piston and pressure vessel to reduce the number of components and volume of the total overall expulsion system. This is an especially beneficial volume limited system and is especially adapted for use on small tactical liquid propelled missiles, but such a system can be used for any pressurized expulsion system for liquid or gelled fluids.

I claim:

1. A pressurized piston expulsion system comprising an elongated cylindrical tank having a cylindrical inner surface, a combination small tank and piston mounted inside said elongated cylindrical tank and sealably and slidably mounted relative to said inner cylindrical surface to define chambers on opposite sides of said small tank and piston, said small tank and piston having a chamber therein for containing high pressure gas therein, and valve means for controlling the flow of gas from said chamber of said small tank and piston and into one of the chambers of said elongated cylindrical tank.

2. A pressurized piston expulsion system as set forth in claim 1, wherein the other chamber of said elongated cylindrical tank is adapted to contain fuel therein and an endwall of said elongated cylindrical tank having a burst disk mounted therein.

* * * * *